(12) United States Patent
Porat

(10) Patent No.: US 8,795,510 B2
(45) Date of Patent: Aug. 5, 2014

(54) POOL CLEANER WITH INTEGRAL CHLORINE GENERATOR

(75) Inventor: Joseph Porat, Delray Beach, FL (US)

(73) Assignee: Aqua Products, Inc., Cedar Grove, NJ (US)

(*) Notice: Subject to any disclaimer, the term of this patent is extended or adjusted under 35 U.S.C. 154(b) by 0 days.

(21) Appl. No.: 10/942,158

(22) Filed: Sep. 15, 2004

(65) Prior Publication Data
US 2006/0053572 A1   Mar. 16, 2006

(51) Int. Cl.
*C02F 1/461* (2006.01)
*C02F 1/00* (2006.01)

(52) U.S. Cl.
USPC ............ 205/743; 15/1.7; 205/464; 205/498; 205/556; 205/618; 205/620; 205/742; 205/744; 210/167.1; 210/167.11

(58) Field of Classification Search
USPC ............ 210/169, 198.1, 203, 167.1, 167.11; 205/742–744, 751, 464, 498, 556, 618, 205/620; 204/228.3, 232, 234–235, 237, 204/240, 275.1, 276; 324/425, 437, 71.1; 15/1.7

See application file for complete search history.

(56) References Cited

U.S. PATENT DOCUMENTS

| | | | |
|---|---|---|---|
| 4,136,005 A | | 1/1979 | Persson et al. |
| 4,229,272 A | | 10/1980 | Yates |
| 4,724,059 A | * | 2/1988 | Collier ...................... 204/228.2 |
| 4,992,156 A | * | 2/1991 | Silveri ....................... 204/229.5 |
| 5,882,512 A | | 3/1999 | Denkewicz, Jr. et al. ..... 210/169 |
| 6,508,929 B1 | | 1/2003 | Mercer |
| 6,798,184 B2 | * | 9/2004 | Honda ......................... 324/71.5 |
| 6,942,766 B2 | | 9/2005 | Lemke |
| 2005/0067300 A1 | * | 3/2005 | Tremblay ...................... 205/742 |

OTHER PUBLICATIONS

Jandy Aqualine Electronic Chlorine Generator Manual (35 pages).
Goldline Controls Electronic Chlorine Generator Technical Information (6 pages).
Pool Plaza Pool School Brochure Chlorine Feeders & How does a salt water pool system work? (5 pages).

* cited by examiner

*Primary Examiner* — Lois Zheng
(74) *Attorney, Agent, or Firm* — Abelman, Frayne & Schwab

(57) ABSTRACT

An automated self-propelled robotic pool cleaner having a housing and drive means for moving the pool cleaner over at least the bottom wall of a pool, is provided with an integral on-board electrochemical chlorine generator for producing chlorine from a chlorine compound, e.g., sodium chloride, that is dissolved in the pool water, a source of electrical power operatively connected to the electrochemical chlorine generator, control means for initiating and terminating the operation of the chlorine generator, and an outlet for discharging water containing chlorine ions produced by the electrochemical generator to thereby distribute the chlorine into the water proximate the exterior of the pool cleaner housing as the pool cleaner follows a programmed operational mode across the bottom and/or side walls of the pool. The operation of the chlorine generator is in response to a manually operated switch and/or signals generated by an automated testing probe, which signals are transmitted directly or indirectly to the control means.

17 Claims, 2 Drawing Sheets

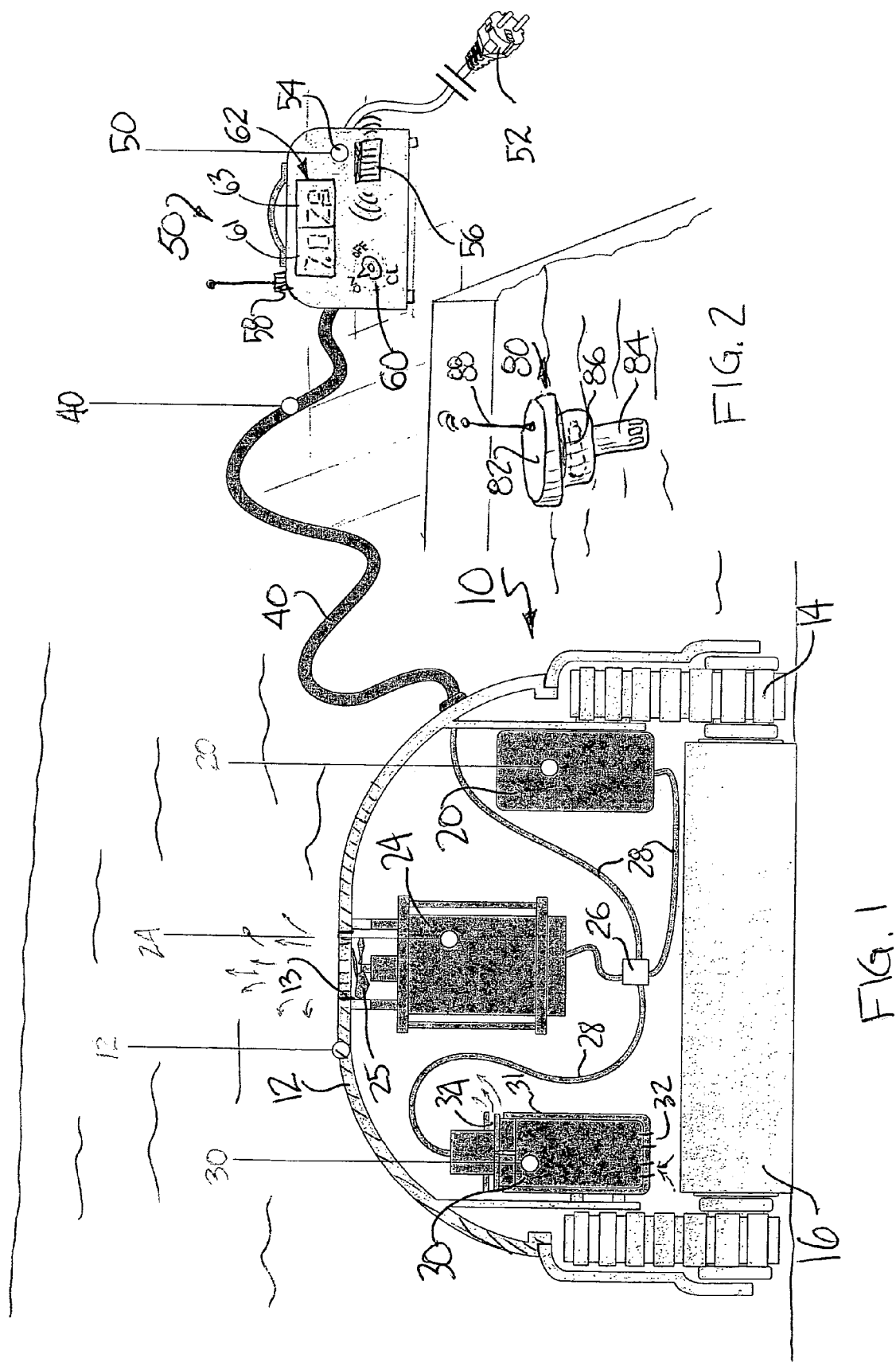

POOL CLEANER WITH INTEGRAL CHLORINE GENERATOR

FIELD OF THE INVENTION

This invention relates to electrochemical chlorine generators for use in chlorinating swimming pools.

BACKGROUND OF THE INVENTION

Electrochemical chlorine generators are available from a number of commercial sources for use in establishing and maintaining bactericidal levels of chlorine ions in swimming pools. The terms "chlorine" "sodium hypochlonte" and "chlorine ions" are used interchangeably herein to refer to the bactericidal ionic form. Electrochemical chlorine generators are installed in-line with the main pumping and filter system outside of the pool. These devices are relatively expensive to purchase and require the services of an experienced plumber and an electrician for their proper installation. Intermittent operation of the generator is required in order to maintain the desired concentration of chlorine. In one automated control system, a probe is immersed in the pool at a representative location in the pool and the probe electronically transmits a signal to a remote poolside controller which, in turn, controls the periodic operation of the cathodic chorine generator. The probe and controller assembly are also expensive to purchase and do require maintenance.

The use of these permanently installed electrochemical generator systems is typically limited to larger commercial and institutional pools where the convenience associated with the essentially continuously controlled introduction of chlorine ions into the pool outweighs the initial costs. These devices also eliminate the need for the purchase of chemicals and either the use of maintenance personnel or automated chemical injection systems.

The initial capital outlay for the purchase of the equipment, as well as the expenses associated with installation by plumbers and electricians, generally discourage the use of electrochemical chlorine generators for the residential pool market. However, saltwater electrochemical chlorinators do produce a highly effective bactericidal sanitizer from a mild saltwater solution that pool users generally find less objectionable than chlorine-producing chemicals typically used in residential pools.

It is therefore an object of the present invention to provide a method and apparatus for generating and adding chlorine to pools that is essentially self-contained and the use of which requires no installation services by a plumber and requires no separate or specialized electrical power connections for its operation.

It is yet another object of the invention to provide a method and apparatus for providing the desired concentration of chlorine ions from an electrochemical generator that relies on conventional test methods used for residential pools, thereby avoiding the necessity of using expensive electronic probes and data processing and transmission control systems.

A further object of the invention is to provide an apparatus and method utilizing an electrochemical chlorine generator that efficiently and effectively distributes the chlorine throughout the volume of water in the pool so as to provide a uniform concentration of the desired chlorine ions and thereby avoid the localized high concentration regions associated with the apparatus and methods of the prior art.

Another object of the invention is to provide an automated system utilizing an electrochemical chlorine generator mounted on a robotic pool cleaner, the operation of the generator being controlled by signals derived from a submerged sampling probe and transmitted either directly or indirectly via a relay receiver/transmitter to the processor/controller on board the pool cleaner.

SUMMARY OF THE INVENTION

The above objects and other advantages are achieved by the method and apparatus of the present invention in which a robotic pool cleaner is provided with an electrochemical chlorine generator which produces and distributes chlorine ions throughout the pool water as the cleaner moves across the pool surfaces being cleaned.

In one preferred embodiment, the pool cleaner operates in a preprogrammed mode designed to efficiently clean the entire surface of the bottom wall and, optionally, the side walls of the pool. The mode of operation during cleaning is not a part of the present invention, and any random or closely prescribed patterns for scanning the pool wall surfaces known to the art can be used. During the execution of the cleaning program, the on-board chlorine generator is activated so long as the desired concentration of chlorine in the pool water has not been attained. Once the desired value is reached, the operation of the chlorine generator is terminated, and the pool cleaner continues its programmed cleaning operation.

In one embodiment, where the cleaning program has been completed, or for other reasons it is not desirable to initiate the cleaning program, the automated pool cleaner can be programmed to periodically move to a new location on the bottom of the pool to equalize the distribution of chlorine ions in the pool. The robotic pool cleaner's programming and mode of operation is adapted to insure that the cleaner with its on-board chlorine generator moves to distribute chlorine throughout the pool. In a preferred embodiment, the pool cleaner is moved to a new location after about ten minutes, maintained in this position for about ten minutes and again moved to a new location. The chlorine is generated continuously during movement and while at each new location.

In the practice of the invention, the person responsible for maintaining the pool periodically checks the chlorine and pH levels in accordance with the standard procedures utilized for pool maintenance. When the chlorine concentration reaches the predetermined desired level, the operation of the on-board electrochemical generator is discontinued. Based upon a period of cyclic operation, the time required to attain the proper chlorine concentration in the pool will become known to the responsible individual. Assuming predictable weather patterns, including sunlight, rain and temperature range, the time of operation of the on-board chlorine generator required to provide the desired chlorine ion concentration can be predicted with reasonable certainty.

The method includes the addition of a sufficient concentration of chlorine-containing chemical compound to the fresh water in the swimming pool to provide for the efficient generation of chlorine by the electrochemical generator housed in the moving pool cleaner. One readily available and economical form of chlorine-containing compound that is convenient to use is sodium chloride, i.e., table salt. Sodium chloride in crystalline form is readily soluble at the required concentrations. The salt can be added to provide a concentration of from about 1,000 parts per million (ppm) to about 3,000 ppm. For purposes of comparison, human tears contain approximately 3,200 ppm of sodium chloride. This level of salt is well below that of typical sea water and is not found objectionable by the average person using the pool. The amount of table salt added to a 25,000 gallon pool is about 630 pounds.

The frequency and quality of salt containing chlorine to be added to the pool is also determined based upon operating experience. Since the chlorine ions generated eventually recombine with the sodium ions, the requirements for adding salt are very low. This provides a further advantage to the present invention. Alternatively, the pool can be filled in whole or in part with seawater. In this embodiment, the chlorine generator produces the chlorine from chloride compounds present in the seawater in the pool.

In one preferred embodiment of the invention, the pool cleaner is equipped with one or more rechargeable on-board batteries and the power requirements of the on-board computer processor/controller, the pump and the drive system are all within the operational capacity of the battery. Alternatively, a separate power source can provide the power requirements to the pool cleaner via a conventional cable from a poolside power supply.

In a further preferred alternative embodiment, the processor/controller is programmable by the user to activate the chlorine generator for prescribed periods of time while the pool cleaner is in operation. As was discussed above, the individual responsible for maintenance of the pool will determine empirically, based on experience, the appropriate times and duration of operation during a predetermined period, such as a day. The control system also has a positive on/off switch so that the chlorine generator can be taken out of service in the event that the desired chlorine level is exceeded by the programmed operation.

When the invention is employed in an automated, self-propelled pool cleaner that receives its power through a cable from a remote power supply, or transformer, typically located at poolside, the electrochemical chlorine generator can also be powered by the same source. In this embodiment, the power supply can include a separate switch for stopping and starting the chlorine generator.

The method and apparatus of the invention can also be used with a robotic pool cleaner that utilizes a remote pump and filter that draws water through a hose or conduit. In order to avoid disabling the turbine, water passing its blades should be free of debris.

In another preferred embodiment, a robotic pool cleaner having an internal water pump and an associated discharge conduit is provided with an electricity generating dynamo powered by a water turbine positioned in the stream discharged from the water pump, the electrical energy derived from the dynamo being utilized to power the electrochemical chlorine generator to produce chlorine ions that are distributed to the surrounding water in the pool.

The water turbine of the dynamo is preferably positioned for rotation in the flow path of the water stream discharged from the pump that draws the pool water and debris through the cleaner's filter system. Alternatively, the turbine can be positioned between the filter and the intake or upstream side of the pump.

The electrical power requirements for an electrochemical chlorine generator for use in the invention is in the range of from 7 to 11 volts at about 8 to 9 amps. Chlorine generating units are commercially available from a number of suppliers, that may be adaptable for use in the present invention. The construction of a suitable device is described in detail below. As a general rule, one ampere of current is required to produce one gram of chlorine.

In the embodiment employing a water turbine as the source of electrical power to the electrochemical generators, the turbine impeller is preferably placed with its axis of rotation in line with the water discharged from the pump. The electrical energy generated by the dynamo is delivered to the electrochemical chlorine generator. The chlorine is mixed with, and discharged from the interior of the pool cleaner housing with the water drawn through the filter and is thereby distributed throughout the water in the vicinity of the pool cleaner by the turbulent movement of the discharge.

BRIEF DESCRIPTION OF THE DRAWINGS

The invention will be further described below and with reference to the attached drawings in which FIG. 1 is a schematic cross-sectional view of one preferred embodiment of the invention in a pool cleaner having an external power supply;

FIG. 2 is a schematic cross-sectional view of an alternative preferred embodiment in which the pool cleaner has an on-board battery and a water turbine power source for the chlorine generator suitable for use in the invention.

DETAILED DESCRIPTION OF THE PREFERRED EMBODIMENTS

Figure 3:
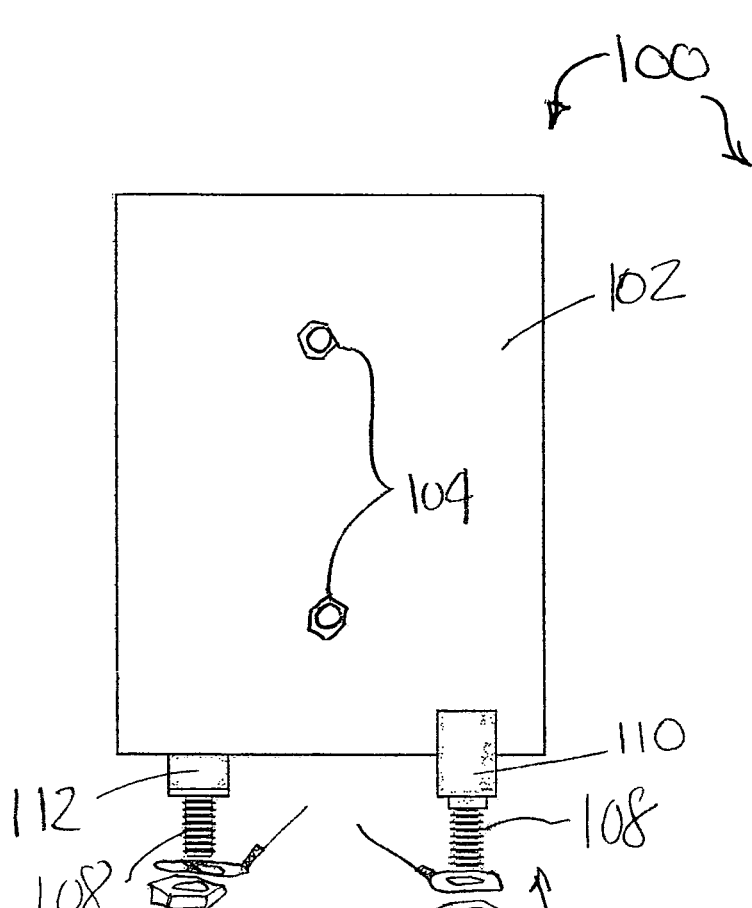
FIG. 3 is a front elevation view of an on-board electrochemical chlorine generator.

Referring now to FIG. 1, there is illustrated one preferred embodiment of the invention in which a robotic pool cleaner 10 is electrically connected via cable 40 to remote poolside power supply 50. For the purposes of describing this invention, the principal elements illustrated are the pool cleaner body or housing 12, a pair of drive means 14 and a cleaning brush 16, the drive means being powered by drive motor 30. Also mounted in the housing is a conventional pump motor 24 with attached impeller 25 that draws water through a filter element (not shown) and discharges the filtered water through outlet 13 in the housing 12. Also mounted on the interior of the housing is electrochemical chlorine generator 20 having inlets 32 through which salt water passes and, as a result of the electrolysis, generates chlorine ions that are dissolved in the water that is discharged through outlets 34. As will be understood by one of ordinary skill in the art, the flow of water through this otherwise conventional pool cleaner housing is through intake openings at the lower portion of the housing and/or base plate and upwardly through a filter where debris is removed and entrained; the water is then discharged through housing outlet 13.

In the preferred embodiment illustrated, an electronic processor/controller in the form of a integrated circuit device 26 is connected by a plurality of conductors 28 to the floating power cable 40 and also to the drive motor 20, pump motor 24 and electrochemical generator 30.

Figure 4:
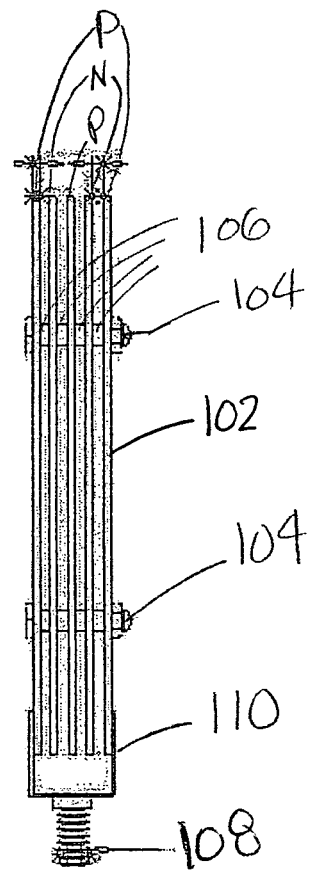
FIG. 4 is a side elevation view of the device of FIG. 3.

Referring now to FIGS. 3 and 4, there is illustrated an electrochemical generator 100 suitable for use on board a pool cleaner to generate chlorine during operation. In this embodiment, the generator consists of five titanium plates with a 6 micron coating of mixed metal oxides of titanium, ruthenium and iridium measuring approximately 60×80 mm and maintained in spaced relation by nylon fasteners 104 and insulated spacers 106. A threaded mounting and terminal bolt 108 is attached to conductor bracket 110 for receiving and applying a positive charge to the two exterior and one central plates labeled "P". Conductor bracket 112 delivers an opposing negative charge to the intermediate plates labeled "N". The plates are approximately 1 mm thick with a gap of 1.5 mm.

The electrochemical generator cell is conveniently secured in a non-conductive, corrosion resistant polymer housing 31 for secure mounting on the pool cleaner housing 12. The housing 31 is preferably cast polycarbonate, but can also be made from ABS or PVC. Terminals 108 are fitted with electrical conductors 28 secured by brass nuts and epoxy to provide the required voltage and amps from the power supply.

The electrochemical generator is designed for operation at a production rate of about 8 grams of sodium hypochlorite/hour. The water containing the active chlorine ion must be moved away from the generator and circulated for mixing with the pool water as efficiently as possible due to the relatively short effective lifetime of the ion.

In one simplified method of operation of the on-board chlorine generator, the individual responsible for proper maintenance of the water conditions in the pool periodically samples the chlorine concentration manually. If the concentration is below the desired value, the switch 60 on power supply 50 is manually turned to the on position, the effect of which is either to send power directly through a separate wire in cable 40 to the chlorine generator 30 or to transmit a signal to processor/controller 26 causing the electrical power to be routed to generator 30.

Continuing with the description of this first embodiment, after a prescribed time interval, the pool water is again sampled for free chlorine concentration. If the desired level has not been achieved, no action is taken and the pool cleaner continues to move through its programmed cycle and the chlorine generator 30 continues to produce chlorine ions that are discharged into the surrounding water and mixed by way of the turbulent action of the pump discharge stream and movement of the cleaner as determined by the program in the processor/controller 26. After a further prescribed interval, the water is again sampled and at such time as the desired concentration of chlorine is reached or exceeded, switch 60 on the power supply is turned to the off position thereby shutting down the chlorine generator. As this process is repeated on a routine basis, the frequency and duration of the related on-off time intervals will establish at least an approximate schedule for operating the electrochemical chlorine generator.

In a further preferred embodiment, the process/controller 26 is programmable by the user to initiate and terminate chlorine generation while the pool cleaner is operating in its customary cleaning mode. As will be understood from the above description, the manual programming of processor/controller 26 will be based upon the experience of the user developed over a suitable period of time, which may be from a few days up to a week or two weeks. Such adjustments may be based upon geographical and seasonal conditions and expectations of sunshine, temperature, daytime exposure to the sun and periods of shade.

A further preferred embodiment will be described with reference to FIG. 2. In this embodiment, the apparatus of the pool cleaner as described in FIG. 1 is used in conjunction with an automated electronic probe 80 that periodically measures the chlorine ion concentration in the pool water. The floating probe 80 can either be tethered to a fixed position or allowed to float randomly on the surface of the pool. The probe 80 includes a housing 82, sampling port 84 with internal electronic ion analyzer (not shown) and is powered by battery 86. A signal corresponding to the periodic analytical results is transmitted via antenna 88 using approved radio frequency (RF) signals. In this embodiment, a floating probe is illustrated, but the probe can be permanently attached to a wall of the pool.

In the embodiment illustrated, the power supply 50 conveniently includes a receiver attached to antenna 58 and a relay transmitter for communicating the signal to a processor contained in either the power supply 50 or the on-board processor/controller 26. When the signal from probe 80 indicates a concentration below the desired value, the relay transmitter in power supply 50 sends an appropriate signal to maintain the operation of the chlorine generator on the pool cleaner. Alternatively, if the probe signal corresponds to an acceptable concentration of chlorine in the pool water, the relay transmitter signals the controller/processor 26 to discontinue supplying power to the generator.

As will be understood by one of ordinary skill in the art, the relay receiver and relay transmitter can be incorporated in a separate housing and provided with a separate source of power. Other features described below can also be included in this separate unit.

In the event that the pool cleaner has completed its cleaning cycle before the desired concentration of chlorine has been achieved the controller/processor continues to direct the movement of the pool cleaner. Similarly, if the chlorine level has been achieved and the pool cleaner has completed its cleaning pattern, the power to the pool cleaner is terminated. Should the probe 80 signal a need for further chlorine generation while the pool cleaner is in the off mode, a signal is sent to the controller/processor 26 to initiate both the movement of the pool cleaner and activation of the chlorine generator. In this manner, chlorine is distributed by the movement of the pool cleaner throughout the body of water in which it is moving.

In a further preferred embodiment of the control system of the invention illustrated in FIG. 1, the relay transmitter located in power supply unit 50 includes a visual display alarm 54, which can be a flashing light source, and/or an audible alarm 56. The alarms are programmed to function when the chlorine concentration as determined by the signal from probe 80 exceeds a prescribed value. The alarms can also be programmed to function if the chlorine concentration has been below a predetermined minimum acceptable value for a predetermined interval, thereby indicating that the electrochemical generator is not functioning properly and that remedial action is required.

With continuing reference to the power supply unit 50, a visual display panel 62, e.g., an LED display, is provided to indicate the numeric values of the water qualities as determined by the probe 80. The panel display 62 preferably includes a separate display 61 for pH and a display 63 for chlorine concentration. Alternatively, a single LED panel can display one, or a plurality of values in a pre-programmed or manually selected sequence.

While various illustrative embodiments have been described in detail, further modifications and variations in the apparatus and method of the invention will be apparent to those of ordinary skill in the art. The full range and scope of the invention, and its equivalents, is therefore to be determined with reference to the claims that follow.

I claim:

1. A method of controlling the release of a bactericidal amount of chlorine in the water of a swimming pool that contains a dissolved chlorine-containing chemical compound, the method including:
   a. placing into the swimming pool an automated, self-propelled pool cleaner having a housing, drive means for moving the pool cleaner over the submerged bottom wall and, optionally, the side wall surfaces of the pool to be cleaned, a pump for moving water through the housing, an outlet in the housing through which the water is discharged, an integral electrochemical chlorine generator secured to the housing, a source of electrical power operatively connected to the electrochemical generator and a processor/controller that is preprogrammed for operating the pool cleaner in a programmed cleaning mode to clean at least the bottom surface of the pool, and for initiating and terminating the drive means and the functioning of the integral electrochemical chlorine generator, the electrochemical chlorine generator comprising a plurality of negative and positive conductive plates arranged in a parallel spaced-apart array to form a plurality of passageways, the array being positioned in the flowpath of water moving through the housing while the pool cleaner is submerged;

b. placing an electronic probe in the body of water of the swimming pool in which the pool cleaner is located for determining the concentration of chlorine by contact with the water contained in the pool, the electronic probe including a signal generator and transmitter in electronic communication with the processor/controller;

c. activating the pool cleaner drive means to thereby move the pool cleaner across a submerged surface of a wall of the pool;

d. initiating operation of the programmed cleaning mode and initiating the operation of the pump to move water through the housing and discharging the water through the outlet in the housing as a pressurized stream to thereby create a zone of turbulent mixing with the pool water in the vicinity of the outlet;

e. initiating the operation of the chlorine generator to thereby produce chlorine from the chlorine-containing compound dissolved in the water;

f. passing flowing water moving through the housing over the plates of the electrochemical chlorine generator;

g. discharging chlorine ion-containing water from the generator inside the submerged moving pool cleaner through the housing outlet and into the mixing zone to thereby distribute a bactericidal amount of chlorine ions into the pool water;

h. periodically measuring and transmitting from the electronic probe in the body of pool water, a signal corresponding to the chlorine concentration in the pool water and comparing the measured value to a predetermined desired concentration of chlorine;

i. transmitting a signal to the processor/controller when the measured value reaches or exceeds the predetermined desired concentration;

j. terminating the operation of the chlorine generator; and k. continuing the operation of the pool cleaner in to the programmed cleaning mode until cleaning is completed.

2. The method of claim 1, wherein the electrical power is delivered to the electrochemical generator from a source selected from the group consisting of an on-board rechargeable battery, a water dynamo/generator mounted on the pool cleaner and a remote power supply electrically connected to the pool cleaner by a cable.

3. The method of claim 2, wherein the electrical power is provided by a water-powered dynamo/generator operatively positioned for rotation in a stream of water that is exiting the pool cleaner housing.

4. The method of claim 1, wherein the water contacting the electrochemical generator is discharged from the pool cleaner housing outlet after passing through a filter inside the pool cleaner housing that removes debris suspended in the water.

5. The method of claim 1, wherein hypochlorite ions are generated from dissolved sodium chloride.

6. The method of claim 1, wherein the chlorine is derived from chloride compounds present in salt water in the pool.

7. The method of claim 1, wherein the chlorine is derived from chloride compounds present in seawater in the pool.

8. The method of claim 1, wherein the pool cleaner processor/controller is operatively connected to a signal receiver, and a control signal is transmitted by a remote relay transmitter and processed to initiate and terminate the operation of the chlorine generator in response to information corresponding to the chlorine concentration of the water contained in the pool.

9. The method of claim 8, wherein the control signal is transmitted to an antenna extending from the pool cleaner processor/controller to and extending above the surface of the water in the pool.

10. The method of claim 8, wherein the signal is transmitted from the relay transmitter to the processor/controller by an electrical conductor.

11. The method of claim 8, wherein the signal transmission from the relay transmitter to the processor/controller is wireless.

12. The method of claim 8 in which the electronic probe is powered by a battery.

13. The method of claim 8, wherein the pool cleaner receives electrical power from a remote power supply via an electric cable connected to the electrochemical chlorine generator in the interior of the housing, which includes the step of manually or electronically activating a switch on the remote power supply to transmit the control signal.

14. The method of claim 1 which includes, after step (k):

l. periodically measuring and transmitting from the electronic probe the chlorine concentration in the pool water and comparing the measured value to a predetermined desired concentration of chlorine; and m. repeating steps (e) through (k) when the measured value is below a predetermined desired concentration;

n. stopping the drive means for a predetermined period of time to thereby halt the movement of the pool cleaner, while continuing the operation of the electrochemical chlorine generator;

o. reactivating the drive means for a predetermined period of time to thereby move the pool cleaner to a new location in the pool, while continuing the operation of the electrochemical chlorine generator; and p. repeating steps (h) through (m).

15. The method of claim 14 which includes, prior to step (l), terminating operation of the pump and drive means after completion of the programmed cleaning mode, whereby the pool cleaner is in an off mode.

16. The method of claim 1 which includes, after step (k):

l. periodically measuring and transmitting from the electronic probe to the processor/controller a signal corresponding to the chlorine concentration in the pool water and comparing the measured value to a predetermined desired concentration of chlorine; and m. repeating steps (e) through (j) when the measured value is below a predetermined desired chlorine concentration.

17. In the method of releasing bactericidal chlorine-containing ions in the water of a swimming pool that contains a dissolved chlorine-containing chemical compound by an electrochemical reaction, the improvement comprising:

a. securing to the housing of an automated, self-propelled pool cleaner that is submerged for operation in the swimming pool an electrochemical chlorine generator comprising a plurality of negative and positive conductive plates arranged in a parallel spaced-apart array to form a plurality of passageways, the array being positioned in the flowpath of water moving through the housing, the pool cleaner being operatively connected to a pump for moving water through the housing, an outlet in the housing through which the water is discharged, drive means for moving the pool cleaner over the surface of the pool to be cleaned, a source of electrical power operatively connected to the electrochemical generator, and a programmed processor/controller that is preprogrammed for operating the pool cleaner in a programmed cleaning mode to clean at least the bottom surface of the pool, and for controlling the movement of the drive means and for initiating and terminating the functioning of the electrochemical chlorine generator and the pump;

b. placing an electronic probe in the body of water of the swimming pool in which the pool cleaner is located for determining the concentration of chlorine by contact with the water located in the pool, the electronic probe including a signal generator and transmitter in electronic communication with the processor/controller;

c. activating the pool cleaner pump to thereby move water through the pool cleaner housing and across the plates of the generator;

d. initiating the operation of the electrochemical chlorine generator while the pool cleaner is submerged to thereby produce chlorine ions from the chlorine-containing chemical compound dissolved in the water;

e. discharging bactericidal chlorine-containing ions into water flowing through the passageways of the generator inside the moving pool cleaner and through the housing outlet in a turbulent flow discharged from the housing to turbulently mix with the water in the pool to distribute a bactericidal amount of chlorine-containing ions into the pool water;

f. activating the drive means and initiating operation of the programmed cleaning mode to thereby move the pool cleaner over a surface of the pool for a period of time to complete the cleaning mode;

g. stopping the drive means for a predetermined period of time to thereby halt the movement of the pool cleaner, while continuing the operation of the electrochemical chlorine generator and the pump;

h. reactivating the drive means for a predetermined period of time to thereby move the pool cleaner to a new location in the pool, while continuing the operation of the electrochemical chlorine generator and the pump;

i. repeating steps (f) and (g);

j. periodically measuring and transmitting from the electronic probe in the body of pool water, a signal corresponding to the chlorine concentration in the pool water and comparing the measured value to a predetermined desired concentration of chlorine;

k. terminating the operation of the chlorine generator when the measured value reaches or exceeds the predetermined desired concentration;

l. repeating step (j); and m. repeating steps (c) through (j) when the chlorine concentration in the pool water is below a predetermined desired concentration.

* * * * *